United States Patent
Hugues et al.

(10) Patent No.: US 12,221,252 B2
(45) Date of Patent: Feb. 11, 2025

(54) PACKAGE COMPRISING DIGITAL DISPLAY MEANS

(71) Applicant: PA.COTTE SA, Pully (CH)

(72) Inventors: Pascal Hugues, Orvault (FR); Nicolas Maffre, Carquefou (FR); Pierre-Alain Cotte, Amberg (DE)

(73) Assignee: PA.COTTE SA, Pully (CH)

( * ) Notice: Subject to any disclaimer, the term of this patent is extended or adjusted under 35 U.S.C. 154(b) by 0 days.

(21) Appl. No.: 18/719,511

(22) PCT Filed: Dec. 14, 2022

(86) PCT No.: PCT/EP2022/085756
§ 371 (c)(1),
(2) Date: Jun. 13, 2024

(87) PCT Pub. No.: WO2023/110964
PCT Pub. Date: Jun. 22, 2023

(65) Prior Publication Data
US 2024/0425236 A1 Dec. 26, 2024

(30) Foreign Application Priority Data
Dec. 17, 2021 (FR) ...................................... 2113895

(51) Int. Cl.
*A47G 19/22* (2006.01)
*B65D 25/20* (2006.01)
*B65D 81/02* (2006.01)

(52) U.S. Cl.
CPC ........... *B65D 25/20* (2013.01); *B65D 81/022* (2013.01); *B65D 2203/00* (2013.01)

(58) Field of Classification Search
CPC ........ A47G 19/2227; A47G 2019/2238; A47G 2019/2244; B65D 2203/12;
(Continued)

(56) References Cited

U.S. PATENT DOCUMENTS

| 2004/0129712 A1* | 7/2004 | Egan ......................... G09F 3/10 |
| | | 220/592.16 |
| 2014/0352264 A1* | 12/2014 | Filicetti ................. A63F 9/0468 |
| | | 206/459.1 |

(Continued)

FOREIGN PATENT DOCUMENTS

| CN | 106672408 A | 5/2017 |
| CN | 107380671 A | 11/2017 |

(Continued)

OTHER PUBLICATIONS

International Search Report and Written Opinion issued by the International Searching Authority, dated Apr. 17, 2023, for International Patent Application No. PCT/EP2022/085756; 12 pages.
(Continued)

*Primary Examiner* — King M Chu
(74) *Attorney, Agent, or Firm* — Faegre Drinker Biddle & Reath LLP

(57) ABSTRACT

The invention relates to a parcel for the transport of objects, comprising:
  a case having a bottom and a peripheral border formed of panels abutted to each other,
  digital display means, making it possible to display delivery information on the parcel, the digital display means comprising a damping system, characterized in that the damping system comprises an elastically deformable cover damping the movement of the digital display means from outside the parcel inwards, and vice versa.

11 Claims, 3 Drawing Sheets

(58) Field of Classification Search
CPC ............ B65D 2203/00; B65D 2203/04; B65D 1279/02; B65D 5/4212; G08B 13/126
USPC .................................. 206/459.1, 459.5, 534
See application file for complete search history.

(56) References Cited

U.S. PATENT DOCUMENTS

| | | | | |
|---|---|---|---|---|
| 2015/0060319 A1* | 3/2015 | Perry | ...................... | G09F 3/208 |
| | | | | 206/459.5 |
| 2020/0410433 A1 | 12/2020 | Rahilly | | |

FOREIGN PATENT DOCUMENTS

| | | | | |
|---|---|---|---|---|
| CN | 107472703 A | 12/2017 | | |
| CN | 106241048 | 4/2020 | | |
| CN | 113498397 A | 10/2021 | | |
| FR | 3092829 | 8/2020 | | |
| FR | 3092829 A1 * | 8/2020 | ............ | B65D 11/10 |
| WO | 2020/165241 A1 | 8/2020 | | |
| WO | 2021/185679 | 9/2021 | | |
| WO | 2021/185792 | 9/2021 | | |

OTHER PUBLICATIONS

English translation of International Search Report issued by the International Searching Authority, dated Apr. 17, 2023, for International Patent Application No. PCT/EP2022/085756; 2 pages.
English translation of Written Opinion issued by the International Searching Authority, dated Apr. 17, 2023, for International Patent Application No. PCT/EP2022/085756; 7 pages.

* cited by examiner

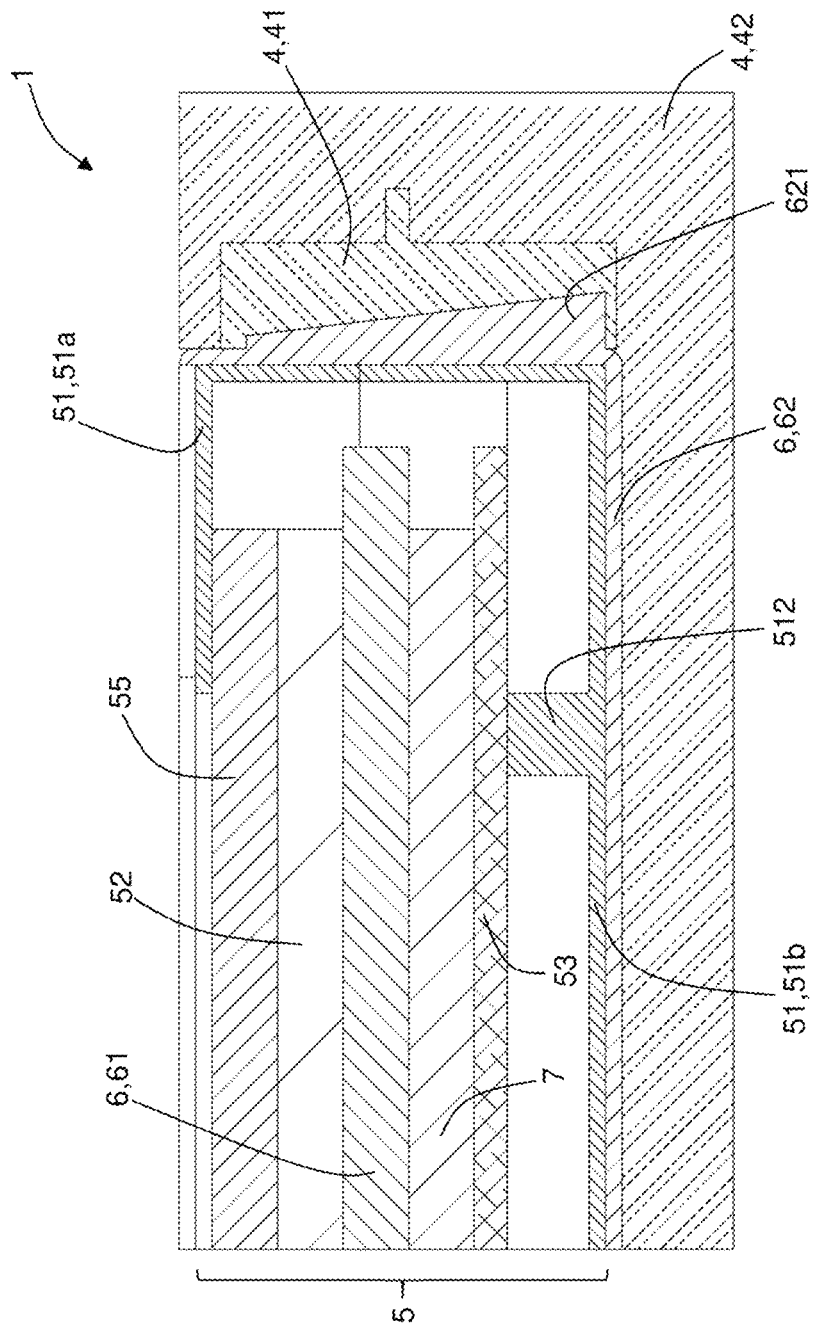

PACKAGE COMPRISING DIGITAL DISPLAY MEANS

CROSS-REFERENCE TO RELATED APPLICATIONS

The present application is a national stage entry of International (PCT) Patent Application Number PCT/EP2022/085756, filed Dec. 14, 2022, which claims priority to French Patent Application Number 2113895, filed Dec. 17, 2021, the complete disclosures of which are expressly incorporated herein by reference.

The field of invention is that of logistics.

More specifically, the invention concerns the design and manufacture of a connected parcel for the transport of objects.

To transport an object between two destinations, the users often use parcels that they can track in real time via computing platforms.

The parcels are increasingly connected, that is to say not only they can be geo-located but they also allow the real-time display of information to the delivery man in order to facilitate their delivery.

For this, parcels have been developed and in particular comprise means for the digital display of delivery information.

These conventionally known digital display means comprise a screen on which the information is displayed in real time.

More particularly, the parcels comprise a case having a bottom and a peripheral border formed of panels abutted to each other.

The peripheral border extends from the bottom to form a stowage volume.

The digital display means are integrated into one of the panels to be accessible to a sender, to a delivery man or to a recipient from outside the parcel.

Furthermore, these display means are coupled to a calculator or to an electronic chip not only for receiving and exchanging information with a remote server, but also for generating a particular display depending on the conditions of use of the parcel.

For example, depending on the geographical area in which the parcel is located, the information displayed on the screen will be adapted.

In other words, when the parcel is in a transit phase, for example in a container on international waters, the display or the information displayed on the screen can be minimalist, that is to say only comprise a bar code for identifying the parcel as well as a country of destination.

On the other hand, when the parcel is located in a logistics center, the information displayed on the screen can be more accurate and in particular comprise, in addition to the parcel identification bar code, detailed information regarding the destination of the parcel, that is to say a department, a city, even a street and a house number.

During the cycle of conveying the parcel to its final destination, the delivery men may be required to interact with the parcel.

For this, the screens are generally associated with physical buttons that can be manipulated by the delivery man or become more and more touchscreens.

In use, repeatedly pressing the physical buttons and/or the screen can cause their deterioration quickly.

Furthermore, the storage of the parcels during their transport in vehicles can generate, in case of a rough road or a sudden change of direction of the vehicle, an uncontrolled movement of a parcel in the vehicle which then hits other parcels, for example.

This may generate a destruction of the screen or, at the very least, a partial degradation of the screen which prevents either the identification of the parcel or the reading of the delivery information and therefore, when appropriate, the correct delivery of the parcel to its recipient.

In addition, when the damage to the digital display means occurs during the delivery of a parcel, it may happen that the parcel cannot be delivered to its recipient due to failure in the identification of the parcel or failure in the delivery inscriptions readable by the delivery man.

It is then necessary to return the parcel to the sender in order to make a new packing for the same recipient.

This is then harmful to the brand image of the sender of the parcel, the brand image of the delivery company and this is not to the liking of the recipient who experiences a delay in the delivery of their parcel.

Furthermore, it is necessary to replace at least the screen of the digital display means to allow a new use of the parcel.

This generates a repair cost that can be significant and potentially constitute a risk of pollution during a phase of recycling the replaced digital display means, since all their components may not be fully recyclable.

The conventional solutions of the protective film type laid on the screen make it possible to limit the appearance of scratches, for example on the screen, but do not offer a guarantee of sufficient protection against shocks that the digital display means may undergo.

The invention aims in particular to overcome the drawbacks of the prior art.

More specifically, the invention aims to propose a solution that makes it possible to protect the digital display means integrated into a parcel against shocks that they may undergo during the delivery of the parcel or, at the very least, to limit the harmful effects of shocks on the digital display means.

The invention also aims to provide such a solution that is easy to integrate into a parcel.

The invention further aims to provide such a solution that is lightweight and that allows maintaining a good internal storage volume in the parcel.

These aims, as well as others that will appear subsequently, are achieved thanks to the invention which relates to a parcel for the transport of objects, comprising:
- a case having a bottom and a peripheral border formed of panels abutted to each other,
- digital display means, making it possible to display delivery information on the parcel, the digital display means being integrated into one of the panels to be accessible from outside the parcel, the digital display means comprising:
- a shell having a front wall on the external side of the parcel and a rear wall on the internal side of the parcel;
- a screen movably mounted in the shell between the front wall and the rear wall, and
- a damping system comprising a shock absorber interposed between the screen and the shell, to dampen the movement of the screen from the front wall to the rear wall, characterized in that the damping system also comprises an elastically deformable cover surrounding the shell, the cover damping the movement of the digital display means from outside the parcel inwards, and vice versa.

The shock absorber and the cover respectively form a first damping level and a second damping level of the digital display means.

Thus, when all the forces applied to the screen are not absorbed by the shock absorber, the cover can deform to absorb another part of the forces and thus protect the screen of the digital display means.

According to one advantageous aspect, the panel on which the digital display means are integrated comprises:
- a skeleton to which the cover is secured,
- a skin in which the skeleton is embedded, the skin being made of an elastically deformable material.

This panel architecture makes it possible to form a third damping level of the digital display means.

Indeed, the skin of the panel can deform to allow absorbing part of the forces applied to the screen, in parallel with the two first damping levels.

Furthermore, the skeleton ensures good rigidity to the panel by allowing mechanical connection, in particular good transmission of the forces, between all the elements of the panel. This therefore avoids a mechanical stress concentration in only a few points when a force is exerted on the screen for example, such a concentration could cause a breakage of the panel.

According to another advantageous aspect, the skin is made of expanded polypropylene.

The expanded polypropylene offers good mechanical resistance while maintaining flexibility allowing its deformation.

The panels are therefore both robust and flexible to ensure their deformation and thus protect the digital display means.

According to another advantageous aspect, the shock absorber comprises a compressible foam of the shock absorption type.

The compressible shock-absorbing foam ensures the absorption of the impact energy on the screen, for example when a user exerts a force to interact with the screen or during a shock on the screen, while by offering a low weight.

According to another advantageous aspect, the compressible foam has a Shore O type hardness comprised between 16 and 22.

Such hardness ensures good absorption of the forces applied to the screen of the digital display means without allowing too much depression of the screen inside the parcel.

This also reveals a qualitative aspect of the parcel since, when the screen is depressed following a shock or too strong pressing from a user, it recovers its initial position once the exerted force is interrupted, which avoids a damaged look of the parcel.

According to another advantageous aspect, the digital display means also comprise:
- an electronic card secured to the rear wall of the shell;
- a metal plate extending between the screen and the electronic card, the shock absorber being interposed between the metal plate and the screen.

Thanks to this architecture, a digital assembly can be formed, comprising the electronic card, the metal plate, the screen and the damping system, the electronic card can then be secured to the metal plate.

Thus, in case of repair of the digital display means, for example when the shell alone is damaged or when the screen alone is damaged, it is possible to replace only part of the digital display means, for example the aforementioned digital assembly, for the benefit of the repair cost, but also of the minimization of the produced waste.

According to another advantageous aspect, the rear wall of the shell has reinforcing bars protruding towards the inside of the shell, the reinforcing bars forming supports for the electronic card.

Thus, when the electronic card is mounted in the shell, it is supported by the rear wall of the shell, at least around the screen, which allows avoiding a clearance between the shell, and more specifically the rear wall of the shell, and the electronic card, which clearance can ultimately generate damage to the electronic card, in particular because of vibrations related to the transport of the parcel.

On the other hand, under the screen, the electronic card is sandwiched between the metal plate and the reinforcing bars, which allows the shell to be more resistant and offers better resistance and better protection for the electronic card and the screen.

According to another advantageous aspect, the reinforcing bars are positioned in the form of a grid forming housings for receiving electrical components secured to the electronic card.

Such a grid increases the mechanical resistance of the assembly, in particular between the front shell and the rear shell around the screen, and between the rear shell and the metal plate under the screen.

According to another advantageous aspect, the display means comprise a tempered glass protection covering the screen, the tempered glass protection being interposed between the screen and the front wall of the shell.

Such tempered glass protection makes it possible to protect the screen from possible breakage due to an impact (in particular due to a bending of the screen or to a localized punching).

Moreover, the tempered glass protection can be removed when appropriate in order to be changed when used.

According to another advantageous aspect, the cover is made of an elastomer material.

The cover can thus deform and recover its initial shape despite a multitude of deformations.

Furthermore, the use of an elastomer material offers flexibility in the movement of the digital display means, for example it accompanies the motions of the user when he presses on the screen.

According to another advantageous aspect, the elastomer material is of the thermoplastic type comprising a shore A hardness comprised between 25 and 35.

This type of material offers the desired elasticity and lightness to guarantee good protection of the digital display means while maintaining a low weight of the parcel.

Other characteristics and advantages of the invention will appear more clearly upon reading the following description of one preferred embodiment of the invention, given by way of illustrative and non-limiting example, and the appended drawings among which:

FIG. 3 is a cross-sectional view of digital display means of the parcel according to the invention.

FIG. 1 illustrates a parcel 1 according to the invention.

Figure 1:
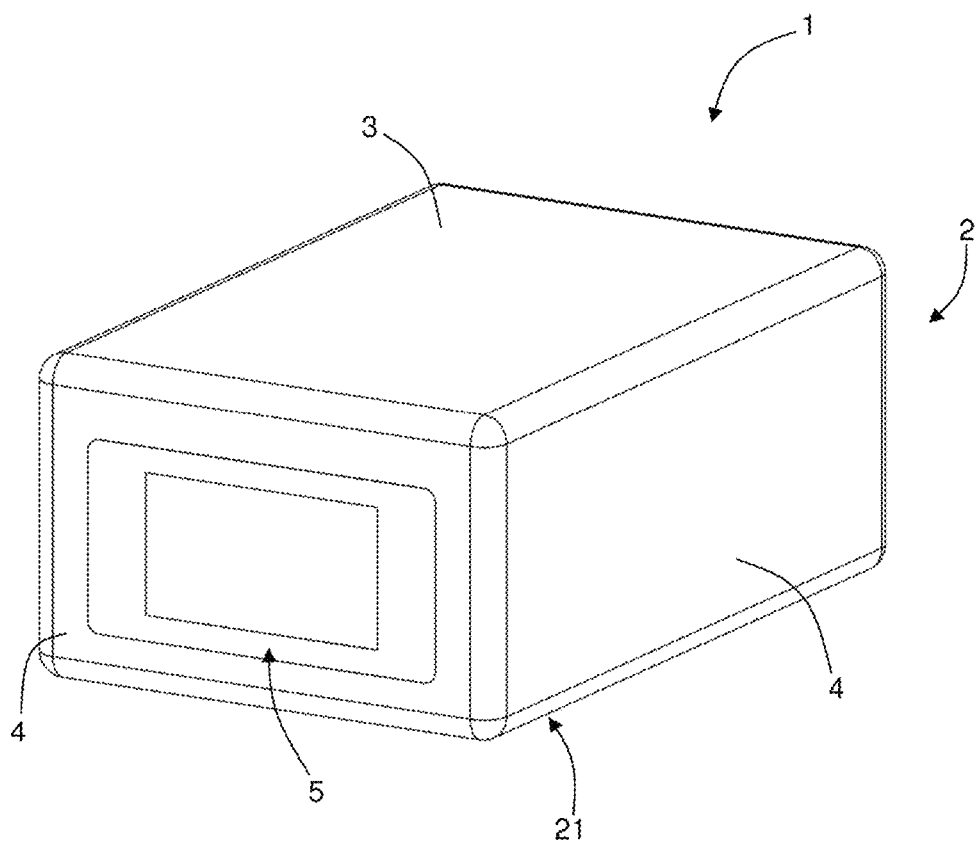
FIG. 1 is a perspective top view of a parcel according to the invention.

Such a parcel 1 comprises a case 2.

The case 2 comprises a bottom 21 and a peripheral rim formed of a plurality of panels 4 abutted to each other.

Furthermore, the parcel 1 comprises a lid 3 making it possible to close a stowage volume internal to the parcel. This internal stowage volume is delimited by the bottom 21 and the peripheral rim formed by the panels 4.

This internal stowage volume makes it possible to receive objects to be transported between an origin address and a destination address.

To allow the conveying of the parcel 1 to its destination address, the parcel 1 comprises an area for displaying the destination information.

More particularly, this display area comprises digital display means 5 secured to one of the panels 4 of the case 2.

Figure 2:
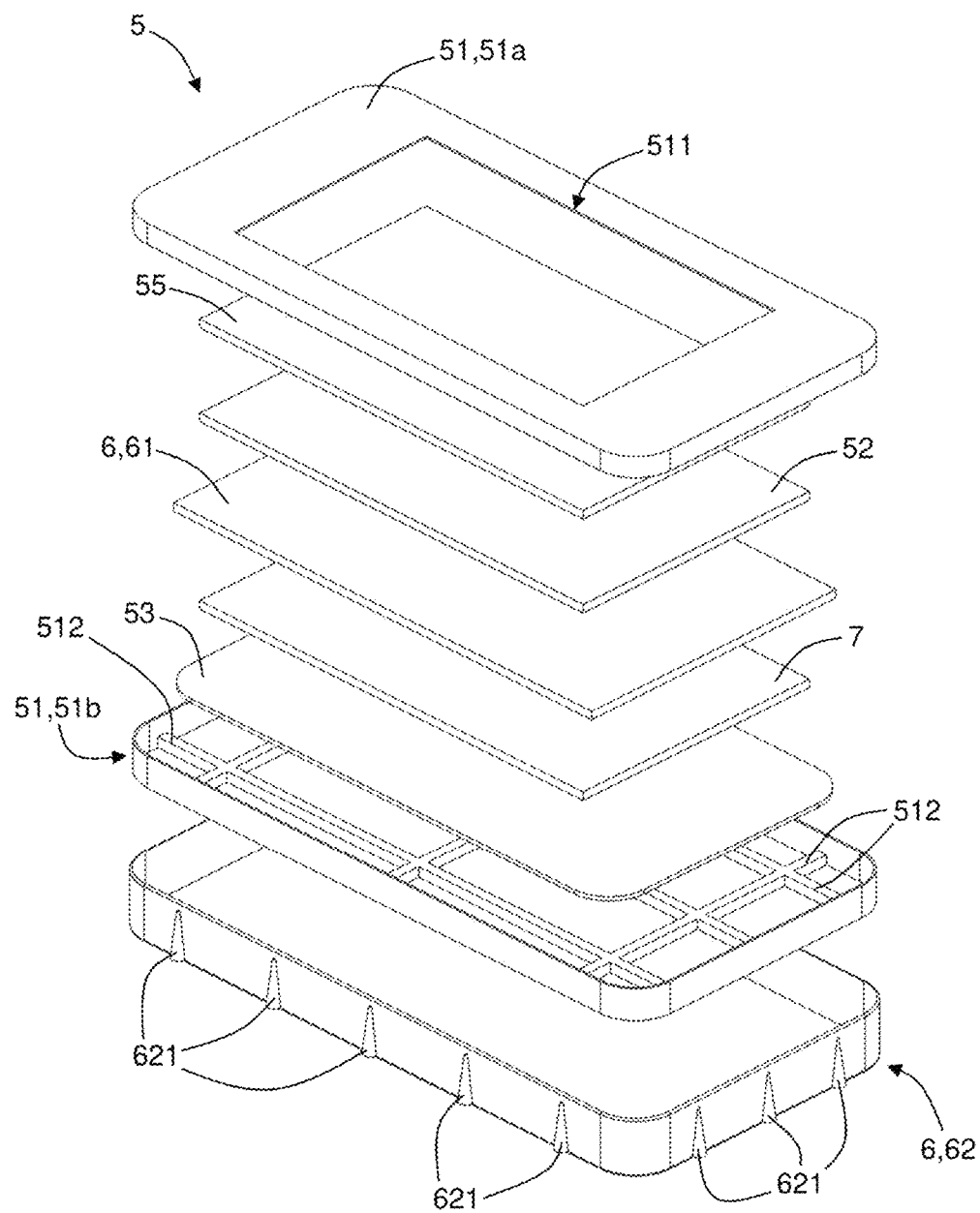
FIG. 2 is an exploded view of the parcel display means according to the invention, according to the second embodiment.

With reference to FIGS. 2 and 3, the digital display means 5 comprise:
- a shell 51;
- a screen 52;
- an electronic card 53 to which the screen 52 is electrically connected, the electronic card 53 being intended to transmit display instructions to the screen 52;
- a metal plate 7;
- a tempered glass protection 55.

More specifically, the shell 51 comprises a front wall 51a located on the external side of the parcel 1 and a rear wall 51b opposite to the front wall 51a, and located on the internal side of the parcel 1.

The front wall 51a and the rear wall 51b each comprise a side border intended to be abutted to each other to form, inside the shell, a space for receiving at least the screen 52 and the electronic card.

In addition, the front wall 51a has an opening 511 allowing access to and visibility of the screen 52 housed in the shell 51.

As can be seen in FIGS. 2 and 3, the tempered glass protection 55 is positioned between the front wall 51a of the shell 51 and the screen 52.

More specifically, the tempered glass protection 55 is positioned against the front wall 51a of the shell 51 so as to cover the opening 511 and thus prevent direct access to the screen 52 from outside the shell 51.

In other words, the tempered glass protection 55 covers the screen 52.

As is visible in the exploded view of FIG. 2, the rear wall 51b of the shell 51 has reinforcing bars 512, forming ribs, protruding towards the inside of the shell 51.

The reinforcing bars 512 form supports for the electronic card 53 making it possible to hold the latter in position in the shell 51 and to increase the mechanical resistance of the digital display means 5 under the screen 52.

More specifically, the reinforcing bars 512 are positioned in the form of a grid forming housings for receiving electronic components secured to the electronic card 53.

The mechanical resistance of the digital display means 5 is also improved around the screen 52, in particular between the reinforcing bars 512 which trap the electronic card 53 therebetween.

The electronic card 53 is secured to the rear wall 51b via flexible fasteners. These flexible fasteners then allow unconstrained movement of the electronic card 53 in order to minimize the elongations of the electronic card in sensitive component implantation areas. Under the screen 52, the electronic card 53 is advantageously sandwiched between the metal plate 7 and the rear wall 51b.

For example, the flexible fasteners are obtained by the presence of oblong holes on the electronic card 53 and of retaining members secured to the rear wall 51b of the shell 51, the retaining members being received in the oblong holes to allow controlled movement of the electronic card 53 relative to the rear wall 51b.

To avoid deterioration of the screen 52 caused by strong pressure from a user or by an object colliding with the screen 52, the digital display means 5 also comprise a damping system 6.

This damping system 6, which is interposed between the screen 52 and the shell 51, tends to dampen the movement of the screen 52 from the front wall 51a to the rear wall 51b.

The damping system 6 comprises a shock absorber 61. The shock absorber 61 is advantageously formed of a compressible foam layer of the shock absorption type.

Preferably, the compressible foam has a Shore O type hardness comprised between 16 and 22.

The use of a compressible foam of the shock absorption type allows that after deformation, the foam tends to recover its initial configuration in a gentle manner, that is to say gradually over time, thus avoiding too brutal movement of the screen 52 in the direction of the front wall 51a. In other words, a compressible foam of the shock absorption type forms a reusable shock absorber, allowing lasting protection of the digital display means 5.

Furthermore, as can be seen in FIG. 2, the digital display means 5 also comprise a metal plate 7.

This metal plate 7 is positioned between the screen 52 and the electronic card 53.

The metal plate is for example made of aluminum or of an aluminum alloy to ensure a protection of the electronic card 53. The use of aluminum or of an aluminum alloy makes it possible to limit the weight of the digital display means 5.

As a variant, the metal plate can also be made of a magnesium alloy, which offers greater rigidity than aluminum or than aluminum alloy while having a lower weight.

As can be seen in FIGS. 2 and 3, the damping system 6 is interposed between the screen 52 and the metal plate 7.

With reference to FIG. 3, it is then observed that the shell 51 contains, from the front wall 51a to the rear wall 51b:
- the tempered glass protection 55;
- the screen 52;
- the shock absorber 61;
- the metal plate 7, and
- the electronic card 53.

This assembly makes it possible to provide a first damping of the digital display means 5 since, when a force is applied to them, this force is attenuated by being applied successively to the different elements as follows:
- the tempered glass protection 55;
- the screen 52;
- the shock absorber 61;
- the metal plate 7, and
- the electronic card 53.

Thanks to the presence of the tempered glass protection 55, the screen 52 is protected from excessively violent forces, and the electronic card 53 is protected by the presence of the shock absorber 61 of the damping system 6. Moreover, by its rigidity, the metal plate 7 makes it possible to limit the deformation of the electronic card 53.

The shock absorber 61 thus forms a first damping level of the digital display means 5.

To further improve their protection against the significant forces, the damping system 6 also comprises an elastically deformable cover 62. The cover 62 surrounds the shell 51 as can be seen in FIGS. 2 and 3.

The cover 62 makes it possible to dampen the movement of the digital display means 5 from outside the parcel 1 inwards, and vice versa.

With reference to FIGS. 2 and 3, the cover 62 has, on its periphery, a plurality of lugs 621.

These lugs 621 allow the retention of the cover in the panel 4.

According to the embodiment illustrated in FIGS. 2 and 3, the lugs have a frustoconical shape. However, other forms could also be used.

The cover 62 is advantageously made of an elastomer material.

For example, the elastomer material is of the thermoplastic type comprising a shore A hardness comprised between 25 and 35.

Advantageously, this type of material is more widely chosen from the TPU family that is to say from the family of the elastomer thermoplastic materials which combine the elastic properties of the elastomers and the mechanical properties of the thermoplastics.

The cover 62 thus forms a second damping level of the digital display means 5.

With reference to FIG. 3, the panel 4 on which the digital display means 5 are integrated comprises:
a skeleton 41 to which the cover 62 is secured,
a skin 42 in which the skeleton 41 is embedded.

The skin 42 is in particular made of an elastically deformable material.

For example, the skeleton 41 is made of injected polypropylene, and the skin 42 is made of expanded polypropylene.

The use of polypropylene makes it possible to provide good mechanical resistance to the panel 4 while limiting its mass.

The use of expanded polypropylene makes it possible to provide, in addition to good rigidity, flexibility to the panel 4.

The flexibility of the panel 4 then forms a third damping level of the digital display means 5.

Indeed, when a force is applied to the digital display means 5, it is then partially absorbed by the flexibility of the skin 42.

The damping system 6 allows a movement of the screen 52 when a too significant force is exerted thereon, in order to limit the damage that this force could cause on the screen 52.

In other words, the damping system makes it possible to absorb significant ad hoc forces applied to the screen 52 for the benefit of its longevity and therefore for the benefit of the readability of the delivery information on the screen 52.

The parcel 1 according to the invention therefore offers a triple damping level of the digital display means 5 allowing the protection of the screen 52.

The first damping level is achieved by the shock absorber 61 which directly absorbs part of the forces applied to the screen 52.

The second damping level is achieved by the cover 62 which absorbs another part of the forces applied to the screen 52 when the shock absorber 61 can no longer absorb forces. The shock absorber 61 then acts as a simple element for transmitting the forces to the rear wall 51b of the shell 51.

However, the second damping level is achieved in parallel with the first damping level. Indeed, the action of each damping level is not done sequentially but continuously until the first damping level is saturated, in which case the first damping level becomes inactive.

The third damping level is achieved by the panel 4 and in particular by the skin 42 of the panel 4 which absorbs the rest of the forces applied to the screen 52. When the force cannot be completely absorbed by the damping system 6, that is to say by the shock absorber 61 and by the cover 62, then the skin 42 of the panel 4 in turn deforms elastically in order to absorb the rest of the force applied to the screen 52.

However, this triple damping level does not allow the protection of the parcel 1 against the acts of vandalism or the large-scale shocks (in particular during an accident) in which case the parcel may be irreversibly destroyed.

As a variant, the digital display assembly 5 could be arranged such that the shell 51 contains, from the front wall 51a to the rear wall 51b:
the tempered glass protection 55;
the screen 52;
the metal plate 7;
the shock absorber 61, and
the electronic card 53.

The invention claimed is:

1. A parcel for the transport of objects, comprising:
a case having a bottom and a peripheral border formed of panels abutted to each other,
digital display means, making it possible to display delivery information on the parcel, the digital display means being integrated into one of the panels to be accessible from outside the parcel,
the digital display means comprising:
a shell having a front wall on the external side of the parcel and a rear wall on the internal side of the parcel;
a screen movably mounted in the shell between the front wall and the rear wall, and
a damping system comprising a shock absorber interposed between the screen and the shell, to dampen the movement of the screen from the front wall to the rear wall, wherein the damping system also comprises an elastically deformable cover surrounding the shell, the cover damping the movement of the digital display means from outside the parcel inwards, and vice versa.

2. The parcel according to claim 1, wherein the panel on which the digital display means are integrated comprises:
a skeleton to which the cover is secured,
a skin in which the skeleton is embedded,
the skin being made of an elastically deformable material.

3. The parcel according to claim 2, wherein the skin is made of expanded polypropylene.

4. The parcel according to claim 1, wherein the shock absorber comprises a compressible foam of the shock absorption type.

5. The parcel according to claim 4, wherein the compressible foam has a Shore O type hardness comprised between 16 and 22.

6. The parcel according to claim 1, wherein the digital display means also comprise:
an electronic card secured to the rear wall of the shell;
a metal plate extending between the screen and the electronic card, and in that the shock absorber is interposed between the metal plate and the screen.

7. The parcel according to claim 6, wherein the rear wall of the shell has reinforcing bars protruding towards the inside of the shell, the reinforcing bars forming supports for the electronic card.

8. The parcel according to claim 7, wherein the reinforcing bars are positioned in the form of a grid forming housings for receiving electrical components secured to the electronic card.

9. The parcel according to claim 1, wherein the display means comprise a tempered glass protection covering the screen, the tempered glass protection being interposed between the screen and the front wall of the shell.

10. The parcel according to claim 1, wherein the cover is made of an elastomer material.

11. The parcel according to claim 10, wherein the elastomer material is of the thermoplastic type comprising a shore A hardness comprised between 25 and 35.

\* \* \* \* \*